United States Patent [19]

Tamer et al.

[11] Patent Number: 4,639,786
[45] Date of Patent: Jan. 27, 1987

[54] TELEVISION SOUND SIGNAL PROCESSOR

[75] Inventors: Gregory G. Tamer, Marion County; David E. Hollinden, Monroe County, both of Ind.

[73] Assignee: RCA Corporation, Princeton, N.J.

[21] Appl. No.: 790,458

[22] Filed: Oct. 23, 1985

[51] Int. Cl.$^4$ ............................................. H04N 5/62
[52] U.S. Cl. ..................................... 358/197; 455/307
[58] Field of Search ................ 358/197, 198; 455/307, 455/337, 339

[56] References Cited

U.S. PATENT DOCUMENTS

| | | | |
|---|---|---|---|
| 3,562,417 | 2/1971 | Poppa | 455/307 X |
| 4,237,485 | 12/1980 | Saito et al. | 358/197 |
| 4,263,611 | 4/1981 | Gibson et al. | 358/23 |
| 4,490,743 | 12/1984 | Mycynek et al. | 358/198 X |
| 4,513,323 | 4/1985 | Patel | 358/197 |
| 4,571,622 | 2/1986 | Davidov et al. | 358/197 X |
| 4,591,915 | 5/1986 | Davidov et al. | 358/197 X |

FOREIGN PATENT DOCUMENTS 54171634 7/1981 Japan .

OTHER PUBLICATIONS

M. Rehak, H. Kriedt, A Quasi-Parallel Audio Channel for Interference-Free Television Audio Signals, Mar. 30, 1979, 349-352.
J. Yamada, M. Uematsu, New Color TV Receiver with Composite SAW IF Filter Separating the Sound and Picture Signals, Aug. 1982, 192-194.
Service Data for RCA Color Television Receiver CTC-131 (file 1984, CTC-131, RCA Corp., Indianapolis, Indiana).

Primary Examiner—James J. Groody
Assistant Examiner—E. Anne Toth
Attorney, Agent, or Firm—P. J. Rasmussen; P. M. Emanuel; R. H. Kurdyla

[57] ABSTRACT

An IF signal filter in the IF sound channel of a television receiver exhibits peak amplitude responses which are unsymmetrical and slightly offset from the nominal picture and sound carrier frequencies by an amount dictated by the amount of tilt introduced by the tuner and the IF signal processing section. As a result, a filtered IF signal applied to a sound demodulating system exhibits a substantially symmetrical characteristic with respect to both the sound and picture carrier frequencies, yielding reduced audio buzz and harmonic distortion.

10 Claims, 1 Drawing Figure

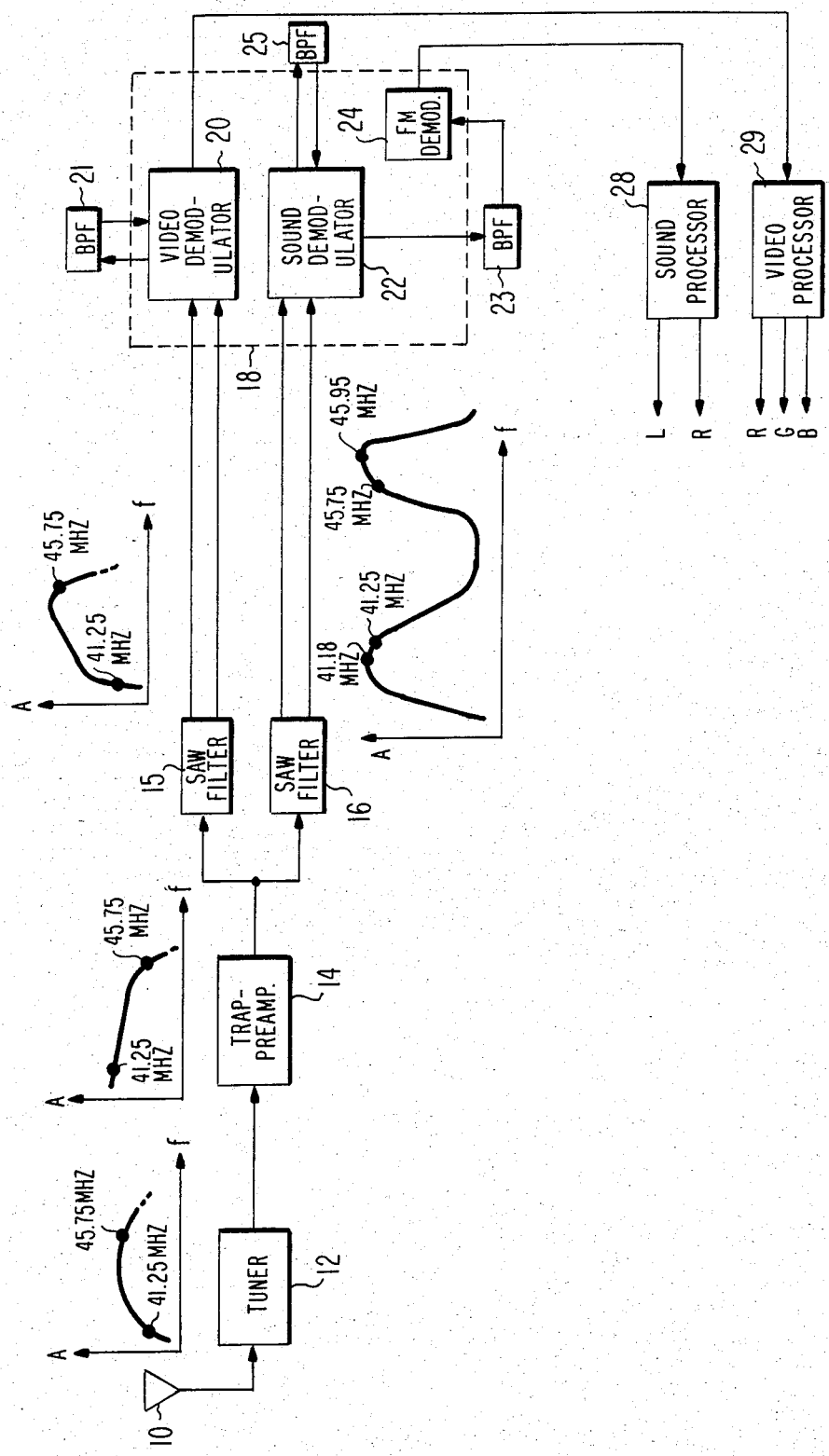

TELEVISION SOUND SIGNAL PROCESSOR

This invention concerns apparatus in a television receiver for improving the quality of sound reproduced by the receiver.

The need for improved quality of sound reproduced by a television receiver has increased with the advent of wider bandwidth signals processed by the sound channel of television receivers designed with multichannel sound capability. Multichannel sound capability, such as is associated with stereophonic and bilingual broadcasting, involves the use of one or more audio subcarriers for forming an aural baseband signal. The aural baseband signal requires that the television audio signal bandwidth be increased to approximately 110 KHz or more as compared to the 15 KHz bandwidth of a monophonic audio program. As a result of the wider bandwidth of the sound processing channel of the television receiver, objectionable audio buzz produced in the sound channel tends to be more noticeable. Harmonic distortion of the sound signal is also more noticeable in wideband systems, and should be reduced along with audio buzz.

Audio buzz, a well-known phenomenon, may be defined as the result of picture related modulation which is transferred to the sound signal. More specifically, buzz results when picture related phase modulated components of the picture carrier are transferred to the sound channel. Considerable buzz occurs at the horizontal line scanning frequency and multiples thereof. Although buzz is more noticeable in receivers with wider bandwidth multichannel (e.g., stereophonic) sound capability, buzz may also occur in monophonic systems in amounts sufficient to be objectionable. The phenomenon of audio buzz in a television receiver system is discussed in detail in an article by P. Fockens et al. titled "Intercarrier Buzz Phenomena Analysis and Cures", published in IEEE Transactions on Consumer Electronics, Vol. 27, August 1981, pp. 381-396.

In a television receiver sound channel, harmonic distortion can be produced as a result of demodulating an FM sound carrier, such as a 4.5 MHz intercarrier sound signal, when such carrier exhibits nonsymmetrical sidebands.

In a disclosed embodiment of the invention, apparatus for improving the quality of reproduced sound is associated with an intermediate frequency (IF) sound detection system, sometimes called "quasi-parallel" IF, in which sound and video signals are separately demodulated in different channels. In the sound channel the picture IF carrier is mixed with the sound IF carrier signal to form a 4.5 MHz intercarrier sound signal. The intercarrier sound signal is subsequently demodulated to produce an audio signal which, after processing, is conveyed to a sound reproducing loudspeaker.

The sound channel includes a filter which receives the sound and picture carriers prior to demodulation. In accordance with the principles of the present invention, the sound channel filter exhibits an amplitude-versus-frequency transfer function with a peak amplitude response at a frequency which is slightly offset from the sound carrier frequency. In a disclosed embodiment, the sound channel filter also exhibits a peak amplitude response at a frequency which is slightly offset from the picture carrier frequency. The offset peak frequencies assist to substantially compensate for an amplitude-versus-frequency "tilt" characteristic such as is often associated with preceding IF signal processing circuits including the tuner of the receiver. The sound channel filter provides an input to a sound demodulating system which is substantially symmetrical with respect to both the sound and picture carrier frequencies as required to produce a properly demodulated sound signal. The described arrangement according to the principles of the present invention not only significantly reduces sound buzz, but also reduces distortion in the demodulated sound signal.

In an illustrated preferred embodiment of the invention, the sound channel filter is a Surface Acoustic Wave (SAW) IF filter having a transfer function which is nonsymmetrical with respect to each of the offset frequency peaks.

The single FIGURE of the drawing illustrates a portion of a television receiver including IF sound signal processing apparatus in accordance with the present invention.

A broadcast television signal received by an antenna 10 is applied to a tuner 12. Tuner 12 selectively translates the RF signal of a selected TV channel to an intermediate frequency (IF) signal including picture and sound carriers at, e.g., 45.75 MHz and 41.25 MHz, respectively, in the NTSC system. The IF picture carrier is an amplitude modulated (AM) vestigial sideband signal containing the composite video information. The IF sound carrier is a frequency modulated (FM) signal. Tuner 12 exhibits an amplitude (A) versus frequency (f) transfer function with respect to the picture and sound carriers as shown by the insert above tuner 12. The tuner response exhibits a "tilt" characteristic, i.e., a deviation from a flat bandpass characteristic around frequencies of interest, as indicated by a difference in amplitude around the sound carrier at 41.25 MHz and around the picture carrier at 45.75 MHz. The amplitude response of the tuner exhibits a "haystack" characteristic in its passband, placing the picture carrier and the sound carrier on opposite slopes of the "haystack". As a result, the sidelobes of the sound and picture carriers are not symmetrical about their respective carrier.

The IF output signal from tuner 12 is applied to a network 14 including a preamplifier and a 47.25 MHz adjacent channel sound trap which prevents automatic fine tuning (AFT) circuits of the receiver from locking onto the adjacent channel sound carrier signal rather than the carrier signal to which the receiver is tuned. The adjacent channel sound trap also exhibits a tilt characteristic around the 41.25 MHz sound carrier and around the 45.75 MHz picture carrier, as shown by the insert above network 14. The output signal from network 14 exhibits a combined tilt characteristic including that of network 14 and tuner 12. The combined tilt characteristic affects the symmetry of the aural sidebands around the sound carrier, and the symmetry of the video sidebands around the picture carrier.

The IF signal from the output of network 14 is split into two separate channels for sound and picture information demodulation in accordance with the quasi-parallel principle by applying it to two bandpass filters 15 and 16. The output signal from network 14 is applied to filter 15 in a picture (video) signal demodulation channel, and to filter 16 in a sound signal demodulation channel. Filters 15 and 16 in this example are of the surface acoustic wave (SAW) type, but may be of the discrete inductance-capacitance type. However, filters 15 and 16 preferably are SAW filters rather than discrete inductance-capacitance type filters because the structure and parameters of a SAW filter permit easier, more predictable tailoring of the filter response to achieve a desired combination of peak frequency, shape and slope characteristics.

Filter 15 has a response, as shown in the insert above filter 15, which matches the vestigial sideband video IF signal and which attenuates the 41.25 MHz sound carrier signal. A differential output signal from filter 15 is applied to differential inputs of a video demodulator network 20 which in this example is included in an integrated circuit 18 such as type T2899 manufactured by Toshiba Corporation. A bandpass filter tank circuit 21 operatively associated with video demodulator 20 is tuned to the picture carrier frequency of 45.75 MHz. Demodulator 20 includes circuits which, in conjunction with bandpass filter 21, form a quasi-synchronous detector that produces an output baseband composite video signal. The baseband video signal is applied to video signal processing circuits in a video processor 29 for producing R, G and B color image representative signals as known.

As will be discussed subsequently, in accordance with the principles of the present invention sound channel filter 16 has a response, or transfer function, as shown in the insert below filter 16. Filter 16 exhibits a double tuned response with a first peak amplitude response which is nonsymmetrical around a frequency of 41.18 MHz slightly offset from the sound carrier frequency of 41.25 MHz, and a second peak amplitude response which is nonsymmetrical around a frequency of 45.95 MHz slightly offset from the picture carrier frequency of 45.75 MHz.

A differential output signal from filter 16 is applied to differential inputs of a sound demodulator network 22 also included in integrated circuit 18. A bandpass filter tank circuit 25 operatively associated with sound demodulator 22 is tuned to the 45.75 MHz picture carrier frequency. Demodulator 22 includes circuits which, in conjunction with bandpass filter 25, form a mixer for providing a 4.5 MHz FM intercarrier sound signal from the sound and picture carriers. A bandpass filter 23, which exhibits a substantially symmetrical amplitude characteristic with respect to the 4.5 MHz center frequency of the intercarrier signal, couples the 4.5 MHz FM intercarrier sound signal from the output of demodulator 22 to an FM demodulator 24. A demodulated baseband audio signal from the output of FM demodulator 24 is applied to a sound signal processor network 28 which includes, for example, a stereo decoder which provides L (left) and R (right) baseband audio signals to audio amplifiers (not shown).

The amplitude-versus-frequency response (transfer characteristic) of filter 16 in the sound channel compensates for the overall system IF "tilt" exhibited by preceding IF signal processing circuits, so that a resulting signal applied to the input of sound demodulator (mixer) 22 is substantially symmetrical in amplitude with respect to the 45.75 MHz picture carrier, and a resulting signal applied to the input of FM demodulator 24 is substantially symmetrical in amplitude with respect to the 4.5 MHz aural intercarrier signal The amplitude symmetry of the demodulator input signal with respect to the 45.75 MHz picture carrier results in significantly reduced audio buzz In this regard it is noted that buzz results from incidental phase modulation produced when the video IF signal component having unequal (unsymmetrical) sidebands is mixed with the sound IF component. The peak amplitude response of filter 16 at 45.95 MHz, in the vicinity of the 45.75 MHz picture carrier, compensates for the effect of the IF tilt of preceding circuits upon the picture carrier frequency, such that the picture carrier presented to the input of sound demodulator 22 desirably exhibits symmetrical sidebands rather than unsymmetrical sidebands likely to produce audio buzz.

The amplitude symmetry of the input signal to FM demodulator 24 with respect to the 4.5 MHz intercarrier signal advantageously reduces the harmonic distortion which would otherwise be produced by the sidebands of the 4.5 MHz FM aural intercarrier signal having a nonsymmetrical amplitude response around the 4.5 MHz carrier. The amplitude symmetry of the input signal to FM demodulator 24 with respect to the 4.5 MHz intercarrier signal advantageously reduces the harmonic distortion inherent to the decoding process of an FM modulated signal.

Thus there is disclosed an IF sound channel with an IF filter exhibiting unsymmetrical peak amplitude responses which are slightly offset from the picture and sound carrier frequencies, in accordance with the amount of tilt in the IF signal passband encompassing the sound and picture carrier frequencies, so that a resulting filtered IF signal as applied to an input of a demodulator system exhibits a substantially symmetrical amplitude characteristic with respect to both the sound and picture carrier frequencies. As a consequence of the disclosed filter arrangement, the television receiver exhibits improved sound quality with reduced audio buzz and harmonic distortion. Apparatus employing the present invention may be used in a television receiver as discussed, as well as in a video cassette recorder.

What is claimed is:

1. In a video signal processing system including a section for processing an IF signal containing a modulated sound carrier and a modulated video carrier, apparatus comprising a surface acoustic wave (SAW) filter for receiving said IF signal from said section, wherein to improve the quality of a sound signal ultimately derived from said modulated sound carrier said SAW filter has a first peak amplitude response at a first prdetermined frequency different from the frequency of said sound carrier and a second peak amplitude response at a second predetermined frequency different from the frequency of said video carrier. carrer.

2. Apparatus according to claim 1, wherein circuits including said IF signal processing section preceding said SAW filter exhibit a deviation from a flat bandpass response around said sound carrier frequency and around said video carrier frequency; and said SAW filter exhibits a transfer function wherein said first peak amplitude response is nonsymmetrical with respect to said first frequency, and said second peak amplitude response is nonsymmetrical with respect to said second frequency.

3. Apparatus according to claim 1, wherein said SAW filter exhibits said first peak amplitude response at a frequency less than the frequency of said sound carrier; and said SAW filter exhibits said second peak amplitude response at a frequency greater than the frequency of said video carrier.

4. In a video signal processing system including a section for processing an IF signal containing a modulated sound carrier and a modulated video carrier, apparatus comprising:
- a video channel for demodulating said video carrier;
- a sound channel including sound demodulating means for demodulating said sound carrier;
- filter means for coupling IF signals including said sound carrier and said video carrier to said sound demodulating means; and
- signal processing means for coupling IF signals including said sound carrier and said video carrier to said filter means; wherein
- to improve the quality of a demodulated sound signal derived from said modulated sound carrier said filter means exhibits a transfer characteristic having a peak amplitude response at a predetermined frequency different from the frequency of said sound carrier.

5. Apparatus according to claim 4, wherein said filter means is a SAW filter.

6. Apparatus according to claim 4, wherein said filter means exhibits a peak amplitude response at a frequency less than the frequency of said sound carrier.

7. In a video signal processing system including a section for processing an IF signal containing a modulated sound carrier and a modulated video carrier, apparatus comprising:
- a video channel for demodulating said video carrier;
- a sound channel including means for providing a demodulated sound signal;
- filter means for coupling IF signals including said sound carrier and said video carrier to said means for providing said demodulated sound signal; and
- signal processing means for coupling IF signals including said sound carrier and said video carrier to said filter means; wherein
- to improve the quality of said demodulated sound signal said filter means exhibits a transfer characteristic having a peak amplitude response at a predetermined frequency different from the frequency of said sound carrier, and a peak amplitude response at a predetermined frequency different from the frequency of said video carrier.

8. Apparatus according to claim 7, wherein
- said signal processing means exhibits a deviation from a flat bandpass characteristic around said sound carrier frequency and around said video carrier frequency;
- said means for providing said demodulated sound signal includes means for providing an intercarrier signal in response to output IF signals from said filter means, and FM demodulator means responsive to said intercarrier signal for providing said demodulated sound signal at an output;
- output IF signals from said filter means exhibit a substantially symmetrical amplitude characteristic with respect to said video carrier frequency; and
- said intercarrier signal exhibits a substantially symmetrical amplitude characteristic.

9. Apparatus according to claim 8, wherein
- said video signal processing system is a television receiver for processing a broadcast-type television signal;
- said sound carrier is a frequency modulated signal;
- said video carrier is an amplitude modulated signal; and
- said filter means is a surface acoustic wave filter.

10. Apparatus according to claim 9, wherein:
said sound channel is a quasi-parallel sound channel.

* * * * *